US012798318B2

(12) United States Patent
Vemulapalli et al.

(10) Patent No.: US 12,798,318 B2
(45) Date of Patent: Nov. 17, 2026

(54) LINKED JOUNCE BOUNCE BUMPER FOR A VEHICLE SUSPENSION ASSEMBLY

(71) Applicant: Ford Global Technologies, LLC, Dearborn, MI (US)

(72) Inventors: Prudhvi Vemulapalli, Livonia, MI (US); Patrick J. Frison, Gibraltar, MI (US); Keith Weston, Canton, MI (US); Amad Wahib, Hamtramck, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 19/188,522

(22) Filed: Apr. 24, 2025

(65) Prior Publication Data

US 2026/0336345 A1 Oct. 29, 2026

(51) Int. Cl.
*B60G 13/08* (2006.01)
*B60G 3/06* (2006.01)
(Continued)

(52) U.S. Cl.
CPC ............... *B60G 13/08* (2013.01); *B60G 3/06* (2013.01); *B60G 15/067* (2013.01); *B60Q 5/005* (2013.01);
(Continued)

(58) Field of Classification Search
CPC .......... B60G 13/08; B60G 13/00; B60G 3/06; B60G 15/067; B60G 2200/142; B60G 2200/17; B60G 2202/24; B60G 2202/32; B60G 2204/128; B60G 2204/422; B60G 2206/10; B60G 2206/73; B60G 2400/00;
(Continued)

(56) References Cited

U.S. PATENT DOCUMENTS 4,690,428 A 9/1987 Fluegge
8,696,004 B2 4/2014 Baker et al.
(Continued)

OTHER PUBLICATIONS

Screen Captures from YouTube Video uploaded by user Camburg Racing, entitled "Camburg Racing Gen 2 Raptor Long Travel System with Fox shocks", uploaded to Youtube on Feb. 2, 2021 (https://www.youtube.com/watch?v=A51WXBVDurw), pp. 1 and 2. (Year: 2021).*
(Continued)

*Primary Examiner* — Jason D Shanske
*Assistant Examiner* — Matthew James O'Neill
(74) *Attorney, Agent, or Firm* — Burr & Forman; Lorne Forsythe

(57) ABSTRACT

The suspension assembly may include a jounce bumper operably coupled to a frame of the vehicle to provide additional damping responsive to max compression of a suspension damper during a compression event, a control arm operably coupled to the frame and a wheel assembly of the vehicle, and a crank arm operably coupled between the jounce bumper and the control arm. The first end of the crank arm may be operably coupled to the jounce bumper, and a second end of the crank arm may be operably coupled to the control arm. The jounce bumper may be pivotable about a first reference line extending in an X-direction of the vehicle at the first end of the crank arm, and the second end of the crank arm may be pivotable about a second reference line extending in the X-direction at the control arm.

19 Claims, 10 Drawing Sheets

(51) Int. Cl.
*B60G 15/06* (2006.01)
*B60Q 5/00* (2006.01)
*B60Q 9/00* (2006.01)

(52) U.S. Cl.
CPC .......... *B60Q 9/00* (2013.01); *B60G 2200/142* (2013.01); *B60G 2200/17* (2013.01); *B60G 2202/24* (2013.01); *B60G 2202/32* (2013.01); *B60G 2204/128* (2013.01); *B60G 2204/422* (2013.01); *B60G 2206/10* (2013.01); *B60G 2206/73* (2013.01); *B60G 2400/00* (2013.01); *B60G 2400/252* (2013.01); *B60G 2401/142* (2013.01); *B60G 2800/162* (2013.01)

(58) Field of Classification Search
CPC ........ B60G 2400/252; B60G 2401/142; B60G 2800/162; B60Q 5/005; B60Q 9/00; F16F 9/49
See application file for complete search history.

(56) References Cited

U.S. PATENT DOCUMENTS

| | | | |
|---|---|---|---|
| 11,420,490 B2 | 8/2022 | Park et al. | |
| 2011/0057371 A1* | 3/2011 | Rezania ................. | B60G 7/001 267/228 |
| 2023/0322037 A1 | 10/2023 | Foley et al. | |
| 2024/0059369 A1 | 2/2024 | Ryan et al. | |

OTHER PUBLICATIONS

Screen Captures from YouTube Video uploaded by user Camburg Racing. First video entitled "Building a Long-Travel Ford Raptor R!", uploaded to Youtube on Sep. 19, 2024 (https://www.youtube.com/watch?v=P8aFBxIOEFg), p. 1 (Year: 2024).*

* cited by examiner

LINKED JOUNCE BOUNCE BUMPER FOR A VEHICLE SUSPENSION ASSEMBLY

TECHNICAL FIELD

Example embodiments generally relate to suspension assembly components and, more particularly, relate to a control arm-linked jounce bumper.

BACKGROUND

Jounce bumpers are common additions to suspension assemblies to add additional damping. At the end of suspension travel, jounce bumpers complement the primary suspension dampers of the suspension assembly at full compression of the suspension damper and the suspension assembly. However, present jounce bumpers are often partially unlinked from the frame and suspension assembly at one end of the bumper. The unlinked nature of the jounce bumpers may increase side loads and create variable coupling points between the jounce bumper and suspension assembly at full compression. Therefore, a fully linked jounce bumper may be desired.

BRIEF SUMMARY OF SOME EXAMPLES

In accordance with an example embodiment, a suspension assembly of a vehicle may be provided. The suspension assembly may include a jounce bumper operably coupled to a frame of the vehicle to provide additional damping responsive to max compression of a suspension damper during a compression event, a control arm operably coupled to the frame and a wheel assembly of the vehicle, and a crank arm operably coupled between the jounce bumper and the control arm. The first end of the crank arm may be operably coupled to the jounce bumper, and a second end of the crank arm may be operably coupled to the control arm. The jounce bumper may be pivotable about a first reference line extending in an X-direction of the vehicle at the first end of the crank arm, and the second end of the crank arm may be pivotable about a second reference line extending in the X-direction at the control arm.

In another example embodiment, a jounce bumper for a suspension assembly of a vehicle may be provided. The jounce bumper may include a first end operably coupled to a frame of the vehicle, a body portion to provide additional damping responsive to max compression of a suspension damper during a compression event, and a second end operably coupled to a crank arm. The crank arm may operably couple the second end to a control arm, a first crank arm end of the crank arm may operably couple to the second end, and a second crank arm end of the crank arm may operably couple to the control arm. The jounce bumper may be pivotable about a first reference line extending in an X-direction of the vehicle at the first crank arm end, and the second crank arm end may be pivotable about a second reference line extending in the X-direction at the control arm.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
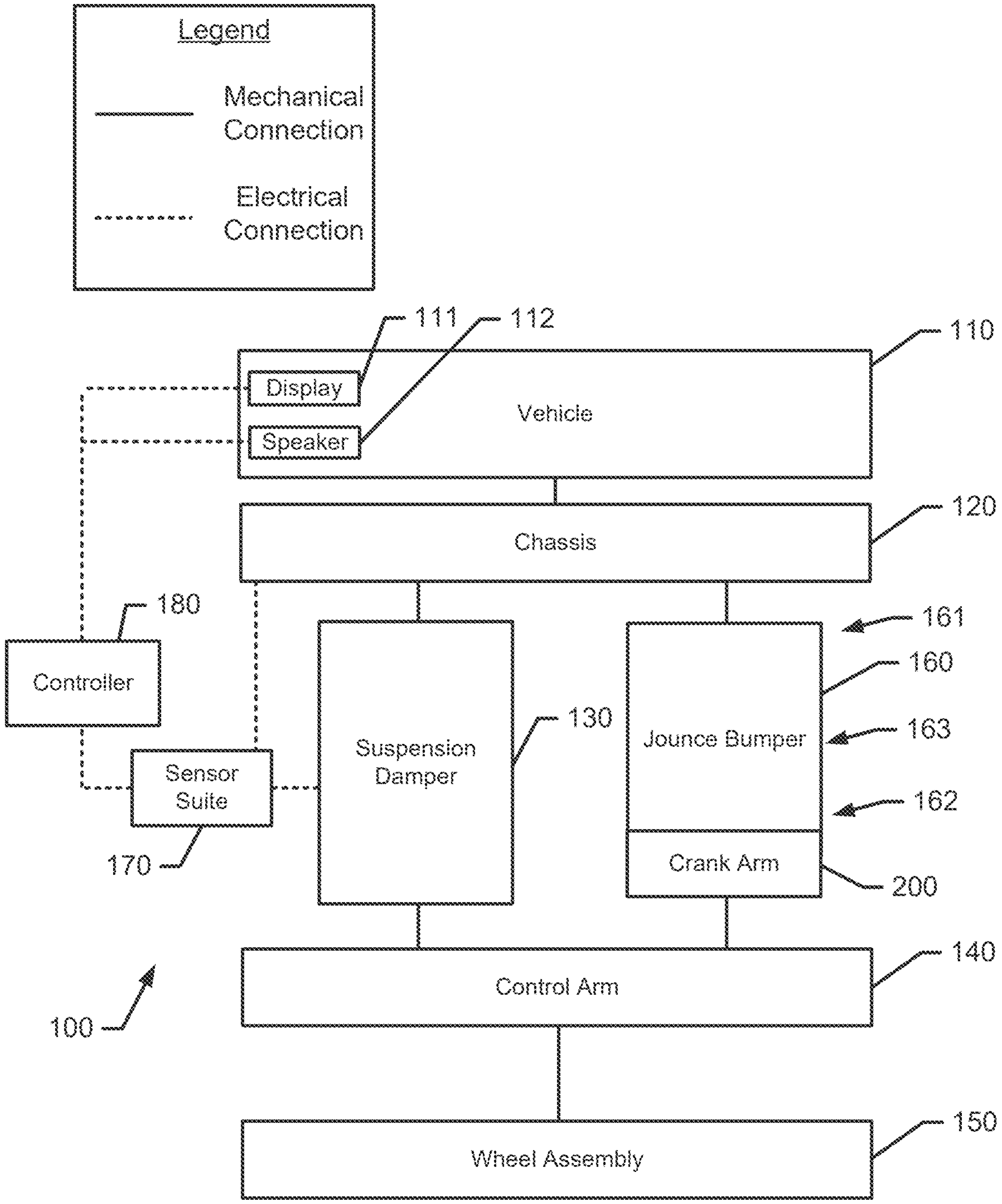
FIG. 1 depicts a block diagram of a suspension assembly for a vehicle in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Additionally, as used herein, terminology such as "about" and "substantially" should be understood to be definite approximations that account for variations in measurements that cannot be, or as one of skill in the art would appreciate, normally are not, measured precisely. Thus, for example, a parameter that is "about" or "substantially" a given value or a given characteristic should be understood to be sufficiently close to the given value or given characteristic such that performance of the object or product to which the parameter applies, from the perspective of one with ordinary skill in the art, is the same as though the object or product had precisely the given value or characteristic.

Some example embodiments described herein may address the issues described above. In this regard, for example, some embodiments may provide a linked jounce bumper to increase performance of a vehicle. As a result, the addition of the linked jounce bumper may increase operator comfort.

FIG. 1 illustrates a block diagram of a suspension assembly 100 for a vehicle 110 in accordance with an example embodiment. As seen in FIG. 1, in some cases, the vehicle 110 may include a frame 120. In an example embodiment, the frame 120 may be a chassis or body of the vehicle 110. In some cases, the chassis or frame 120 may support and form the foundation structure of the vehicle 110. In an example embodiment, the chassis and frame may be formed of one or more casted subframes, and a suspension damper 130 may be operably coupled to the chassis or frame 120 to help operably couple a control arm 140 to the chassis or frame 120.

In some cases, the suspension damper 130 may be one or more vertical dampers. For example, the vehicle 110 may include one instance of the suspension damper 130 on a first side of the vehicle 110 and another instance of the suspension damper 130 on a second side of the vehicle 110, or also known as a staggered shock set up. The suspension damper 130 may absorb or dampen the compression (jounce) and rebound of the frame 120 while the vehicle 110 is in motion. The suspension damper 130 may be referred to as and/or be a vertical shock absorber, a strut, or any other suspensions member that may dampen the vehicle 110. The suspension damper 130 may be positioned at angle between 70 degrees and 110 degrees relative to the driving surface driven on by the vehicle 110. In some cases, the suspension damper 130 may be an active, semi-active, or passive damper and may be a hydraulic damper. In an example embodiment, the active or semi-active dampers may utilize measurements from a sensor suite 170 of the vehicle 110 to adjust the dampers.

In some cases, the suspension assembly 100 may include the control arm 140. The control arm 140 may assist in operably coupling a wheel assembly 150 to the frame 120. The control arm 140 may operably couple to a knuckle of the wheel assembly 150 to allow for movement of the wheel assembly 150 while maintaining wheel alignment.

In an example embodiment, the suspension assembly 100 may include a jounce bumper 160. The jounce bumper 160 may be disposed proximate the suspension damper 130. In some cases, the jounce bumper 160 may have the same orientation as the suspension damper 130 in order to provide additional damping in the same direction as the suspension damper 130. The jounce bumper 160 may provide the additional damping in response to the suspension damper 130 experiencing a max compression event. A max compression event may be defined as an event in which the suspension damper 130 fully compresses and provides the maximum damping possible for the suspension damper 130 at its present settings. In some cases, the jounce bumper 160 may be a hydraulic jounce bumper.

Immediately before a max compression event (e.g. traversing uneven terrain on an off-roading path, encountering certain chassis input such as ruts or bumps) or in response to a max compression event occurring, the jounce bumper 160 may engage and provide the additional damping. The engagement of the jounce bumper 160 may prevent or limit the compression of the suspension assembly 100 and thus limit the contact of components of the suspension assembly 100 or the wheel assembly 150 with the frame 120 or other vehicle components. The compression of the suspension assembly 100 may be considered jounce, and the return of the suspension assembly 100 from jounce may be considered rebound. The position of the suspension assembly 100 outside of jounce and rebound may be considered the resting position. The resting position may be defined as the position of the suspension assembly 100 responsive to the vehicle 110 traversing a smooth driving surface or the position of the suspension assembly 100 according the factory design.

In some cases, the jounce bumper 160 may be operably coupled to the frame 120 and the control arm 140. For example, a first end 161 of the jounce bumper 160 may be operably coupled to the frame 120, and a second end 162 of the jounce bumper 160 may be operably coupled to the control arm 140. The jounce bumper 160 may also include hydraulic jounce bumpers and may include a body portion 163. The body portion 163 may include the hydraulic functionality of the jounce bumper 160 and may be disposed between the first end 161 and the second end 162. The operably coupling of the jounce bumper 160 at both the first end 161 and the second end 162 may ensure a consistent contact point of the jounce bumper 160 within the suspension assembly 100 or vehicle 110. In some cases, the contact point of the jounce bumper 160 may be disposed on, integrated in, or operably coupled to the control arm 140. Having a consistent contact point on the control arm 140 for the jounce bumper 160 may prevent improper contact between the jounce bumper 160 and suspension assembly 100, as well as may ensure proper return to the resting position after jounce and rebound of the suspension assembly 100.

In an example embodiment, operably coupling the jounce bumper 160 at both the first end 161 and the second end 162 may increase stability and performance of the jounce bumper 160 and suspension assembly 100. For example, due to operably coupling at both the first end 161 and the second end 162, the movement of jounce bumper 160 may follow a consistent path and may reduce unknown loads experienced by the suspension assembly 100 and the vehicle 110. In this regard, side loads experienced by the suspension assembly 100 may decrease compared to typical suspension assemblies, as the control arm 140 has an additional coupling point to the frame 120.

In some cases, the second end 162 of the jounce bumper 160 may operably couple to the control arm 140 via a crank arm 200. The crank arm 200 may be operably coupled to the second end 162 to the jounce bumper 160 and may be operably coupled to the control arm 140 at a position separate from the contact point. In an example embodiment, the crank arm 200 may be integrated with the jounce bumper 160.

In some cases, the suspension assembly 100 may include the sensor suite 170 and a controller 180. The controller 180 may be configured to receive data from the sensor suite 170 and may adjust the vehicle 110 or the suspension assembly 100 based on the data from the sensor suite 170. The sensor suite 170 may include but is not limited to frame height sensors (or chassis height sensors), suspension height sensors, wheel speed sensors, accelerometers, cameras, and global positioning sensors (GPS). The sensor suite 170 may also be a component of an active suspension system and may be utilized by other vehicle assemblies and systems other than the suspension assembly 100. The controller 180 may also be configured to control or send inputs to displays 111 or speakers 112 of the vehicle 110.

In an example embodiment, the controller 180 may be a control module. In some cases, the controller 180 may include one or more control modules (i.e., sub-control modules or operably coupled to other control modules). The controller 180 may include processing circuitry that includes a processor and memory. The processing circuitry may be configured to provide electronic control of the inputs to one or more functional units of the suspension assembly 100 and to process data received at or generated by the one or more functional units of the suspension assembly 100. Thus, the processing circuitry may be configured to perform data processing, control function execution and/or other processing and management services according to an example embodiment. In some embodiments, the processing circuitry may be embodied as a semiconductor chip or chip set. In other words, the processing circuitry may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry may therefore, in some cases, be configured to implement an embodiment of the present invention on a single chip or as a single "system on a chip." As such, in some cases, a chip or chipset may constitute means for performing one or more operations for providing the functionalities described herein. In an example embodiment, other vehicle control modules may include similar processing circuitry.

Figure 2:
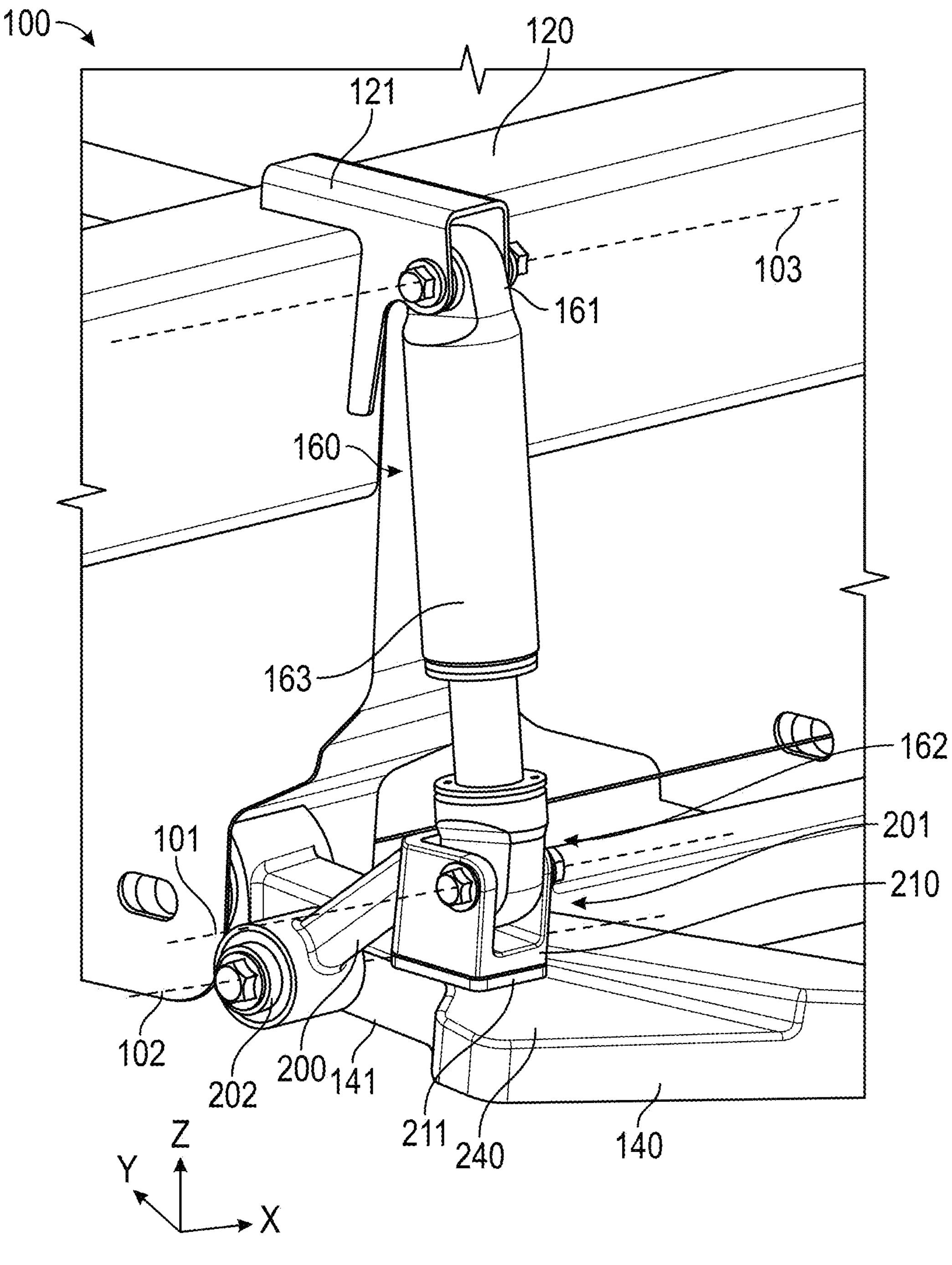
FIG. 2 illustrates a perspective view of a suspension assembly for a vehicle in accordance with an example embodiment.

FIG. 2 depicts a profile view of the suspension assembly in accordance with an example embodiment. As shown in FIG. 2, the crank arm 200 directly operably couples the jounce bumper 160 and the control arm 140 to each other. The crank arm 200 may include a first crank arm end 201 and a second crank arm end 202. The first crank arm end 201 may operably couple to or be integrated with the second end 162 of the jounce bumper 160. The second crank arm end 202 may operably couple to the control arm 140 at a first position 141. In some cases, the first position 141 may be separate from the location of an integrated contact pad 240 integrated within the control arm 140.

The integrated contact pad 240 may be the contact point between the jounce bumper 160 and the control arm 140 responsive to the max compression of the suspension damper 130. The integrated contact pad 240 may be formed directly in the control arm 140. In an example embodiment, the jounce bumper 160 may engage with the integrated contact pad 240 via the crank arm 200. The crank arm 200 may engage and make contact with the integrated contact pad 240 via a hammer portion 210. The hammer portion 210 may be disposed at the first crank arm end 201.

The hammer portion 210 may include a contact surface 211. The contact surface 211 may engage and interface with the integrated contact pad 240 responsive to the max compression of the suspension damper, upon which additional damping may be provided by the jounce bumper 160. The contact surface 211 may be rounded to limit contact with integrated contact pad 240 to increase the durability of the jounce bumper 160, the contact surface 211, and the integrated contact pad 240.

In an example embodiment, the crank arm 200 and the control arm 140 may both be made of the same material. The material may include but is not limited to aluminum, steel, or other metal alloys. In some cases, at least one of the contact surface 211 or the integrated contact pad 240 may be include an elastomeric material to prevent metal-on-metal contact and limit noise caused from the engagement of the contact surface 211 and the integrated contact pad 240. The elastomeric material may include but is not limited to rubber, polymers, or other materials that allow for quiet engagement between the contact surface 211 and the integrated contact pad 240.

In an example embodiment, the crank arm 200 may pivot at both the first crank arm end 201 and the second crank arm end 202. The first crank arm end 201 may pivot about a first reference line 101 extending in an X-direction of the vehicle 110 at the second end 162 of the jounce bumper 160, and the second crank arm end 202 may pivot about a second reference line 102 extending in the X-direction at the first position 141 of the control arm 140. In this regard, the jounce bumper 160 may have a larger range of motion compared to a typical jounce bumper due to a pivotable extension the crank arm 200 and thus the jounce bumper 160. The pivotable nature of the crank arm 200, as well as the crank arm 200 operably coupling the jounce bumper 160 to both the frame 120 and the control arm 140, may ensure the hammer portion 210 (specifically the contact surface 211) consistently engages with the control arm 140 (specifically the integrated contact pad 240).

In some cases, the first end 161 of the jounce bumper 160 may also pivot about a third reference line 103 extending in the X-direction at a coupling point between the jounce bumper 160 and the frame 120. The coupling point between the first end 161 of the jounce bumper 160 and the frame 120 may be a C-link bracket 121 operably coupled to the frame 120 with a bushing or a bearing. The pivot connections of the first end 161, the second end 162, the first crank arm end 201, the second crank arm end 202, and the first position 141 of the control arm 140 may be formed via a combination of bushings, bearings, brackets, receiving orifices, fasteners (e.g. screws, bolts, etc.) or any other coupling mechanism to form a pivot connection.

In some cases, the crank arm 200 may include a curved portion to increase a movement range of the crank arm 200 and jounce bumper 160. The movement range may increase due to the crank arm 200 have a smaller footprint, and thus limiting potential interference with other components of the vehicle 110 and the suspension assembly 100. The curved portion may also enable the interaction between the hammer portion 210 and the integrated contact pad 240 by providing increased clearance for the crank arm 200. In an example embodiment, the first crank arm end 201 may operably couple with the second end 162 of the jounce bumper 160 via a U-bracket 221. The hammer portion 210 may include or be integrated with the U-bracket 221. The U-bracket 221 may receive a bushing or bearing of the second end 162 of the jounce bumper 160. A fastener assembly 122 may couple the U-bracket 221 and the bushing or bearing of the second end 162. For example, the fastener assembly 122 may include a bolt and a nut. The U-bracket 221 may be any number of shapes other than U-shaped, as long as the functionality of the U-bracket 221 is not modified.

Figure 3:
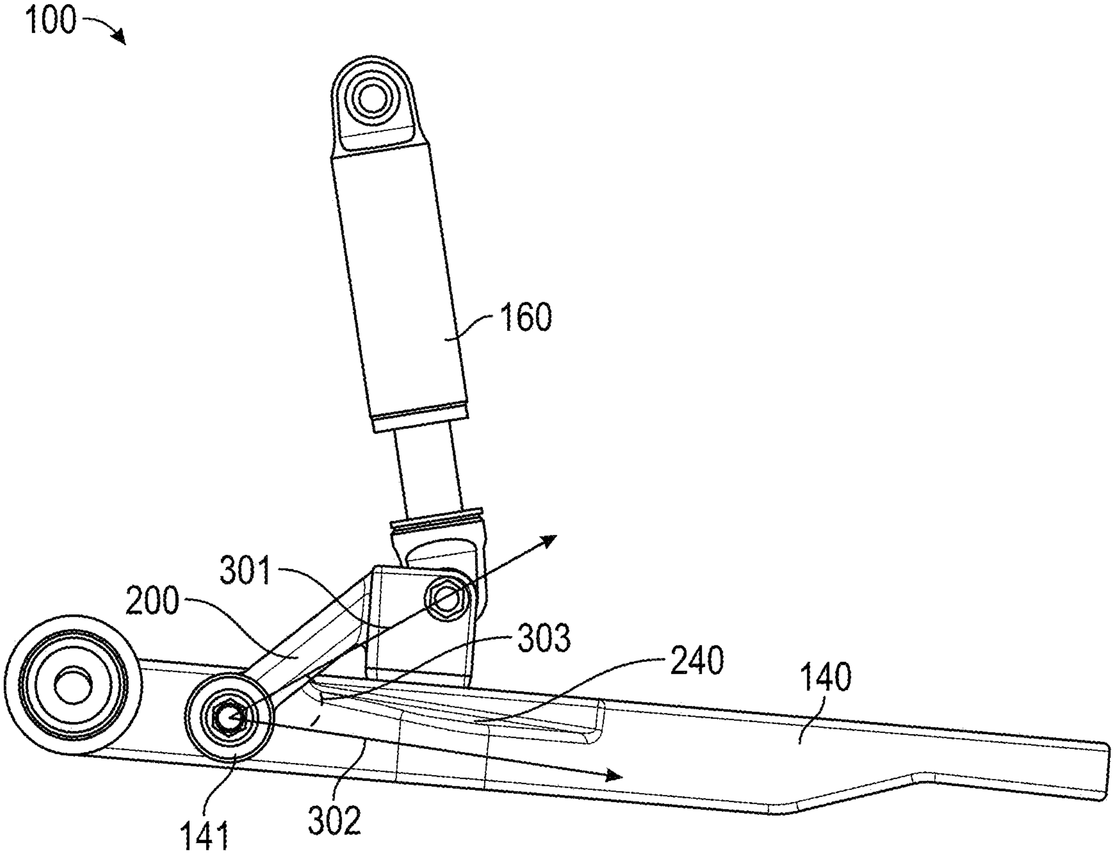
FIG. 3 depicts a side view of a suspension assembly for a vehicle in a resting position in accordance with an example embodiment.
Figure 4:
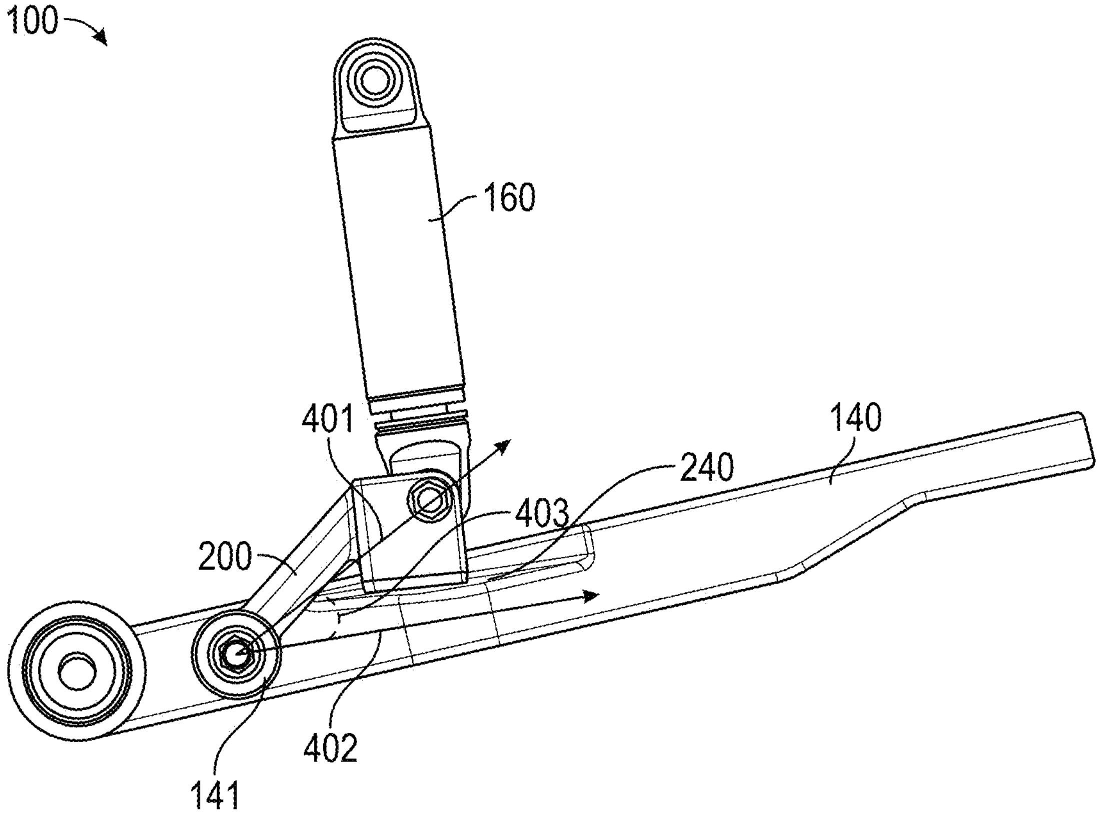
FIG. 4 illustrates a side view of a suspension assembly for a vehicle in a jounce position in accordance with an example embodiment.
Figure 5:
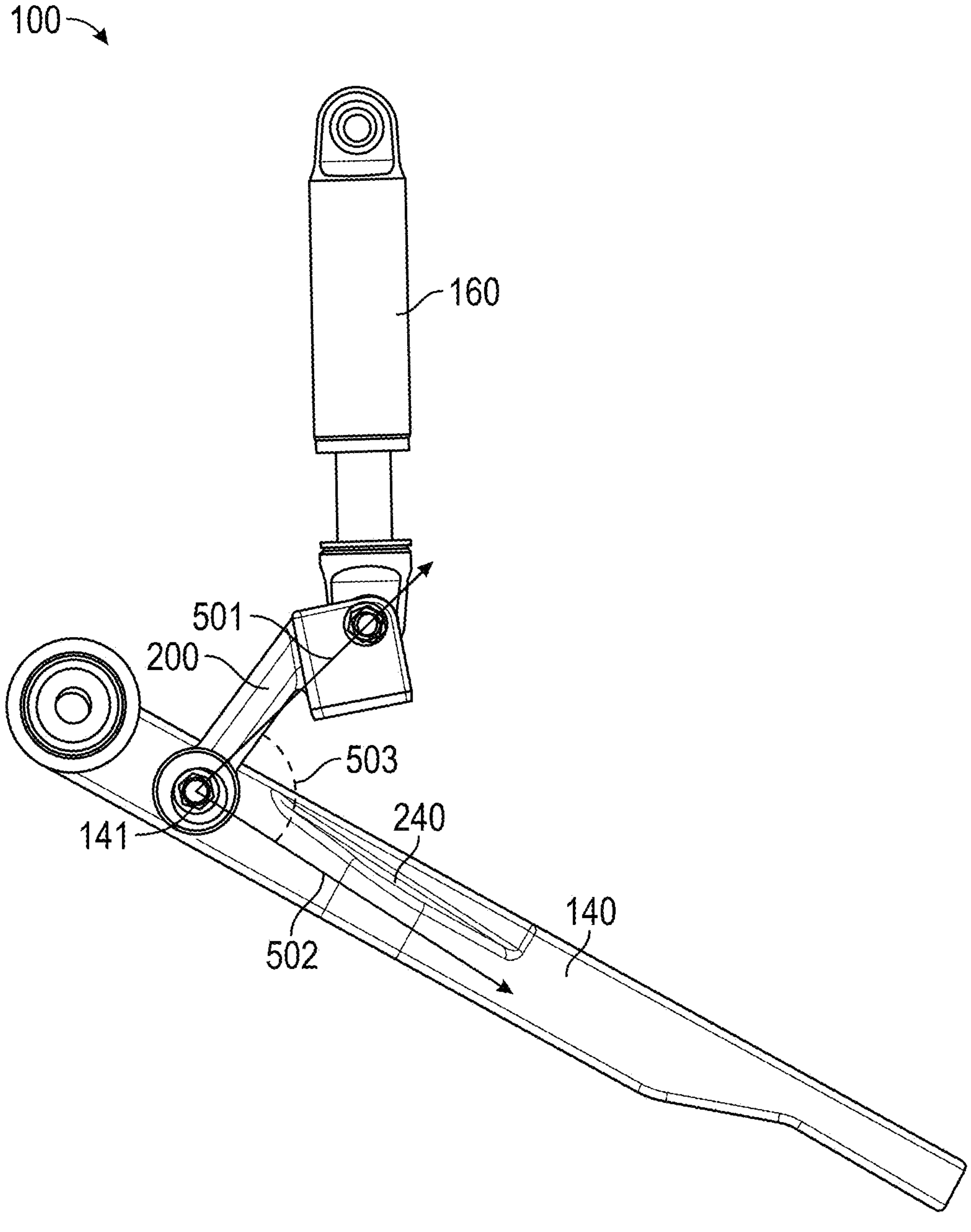
FIG. 5 depicts a side view of a suspension assembly for a vehicle in a rebound position in accordance with an example embodiment.

FIGS. 3-5 depict the jounce bumper, the control arm, and crank arm during a resting position, a jounce position, and a rebound position, respectively, in accordance with an example embodiment. In some cases, responsive the vehicle 110 being stationary or the vehicle 110 traversing a flat driving surface, the suspension assembly 100 may be in a resting position as seen in FIG. 3. In this regard, the jounce bumper 160 and the control arm 140 may not be engaged, nor the crank arm 200 in an extended position.

In an example embodiment, responsive to the suspension assembly 100 being in the resting position, a resting position crank arm reference line 301 may extend substantially parallel to the points of operably coupling of the crank arm 200 with the jounce bumper 160 and the control arm 140, and a resting position control arm reference line 302 may extend substantially parallel to the integrated contact pad 240. The resting position crank arm reference line 301 and the resting position control arm reference line 302 may form a first angle 303.

In some cases, responsive to the vehicle 110 experiencing jounce (e.g. compression of the suspension assembly 100 responsive a bump, landing, etc.), the suspension assembly 100 may be in a jounce position as seen in FIG. 4. The jounce position seen in FIG. 4 may be responsive to max compression of the suspension damper 130, as the (hydraulic) jounce bumper 160 is fully compressed. In the jounce position, the hammer portion 210 (and thus contact surface 211) may be engaged with the control arm 140. In an example embodiment, responsive to the suspension assembly 100 being in the jounce position, a jounce position crank arm reference line 401 may extend substantially parallel to the points of operably coupling of the crank arm 200 with the jounce bumper 160 and the control arm 140, and a jounce position control arm reference line 402 may extend substantially parallel to the integrated contact pad 240. The jounce position crank arm reference line 401 and the jounce position control arm reference line 402 may form a second angle 403.

In some cases, after the vehicle 110 experiences jounce, the suspension assembly 100 may rebound and may be in a rebound position as seen in FIG. 5. The rebound position may be the position of the suspension assembly 100 prior to the return of the suspension assembly 100 to the resting position after jounce. In some cases, the rebound position may be a position extended past the resting position (e.g. as seen in FIG. 5) before returning the resting position. In an example embodiment, responsive to the suspension assembly 100 being in the rebound position, a rebound position crank arm reference line 501 may extend substantially parallel to the points of operably coupling of the crank arm 200 with the jounce bumper 160 and the control arm 140, and a rebound position control arm reference line 502 may extend substantially parallel to the integrated contact pad 240. The rebound position crank arm reference line 501 and the rebound position control arm reference line 502 may form a third angle 503.

The first angle 303 (resting position) may be an angle between the second angle 403 (jounce position) and the third angle 503 (rebound position). The first angle 303, the second angle 403, and third angle 503 may all vary in degree depending on the compression event experienced by the vehicle 110 and the suspension assembly 100. For example, the second angle 403 and the third angle 503 may have an inverse relationship. In this regard, the smaller the second angle 403 may be, the larger the third angle 503 may be as jounce and rebound are directly tied to one another (the larger the compression (or jounce), the larger the rebound).

Figure 6:
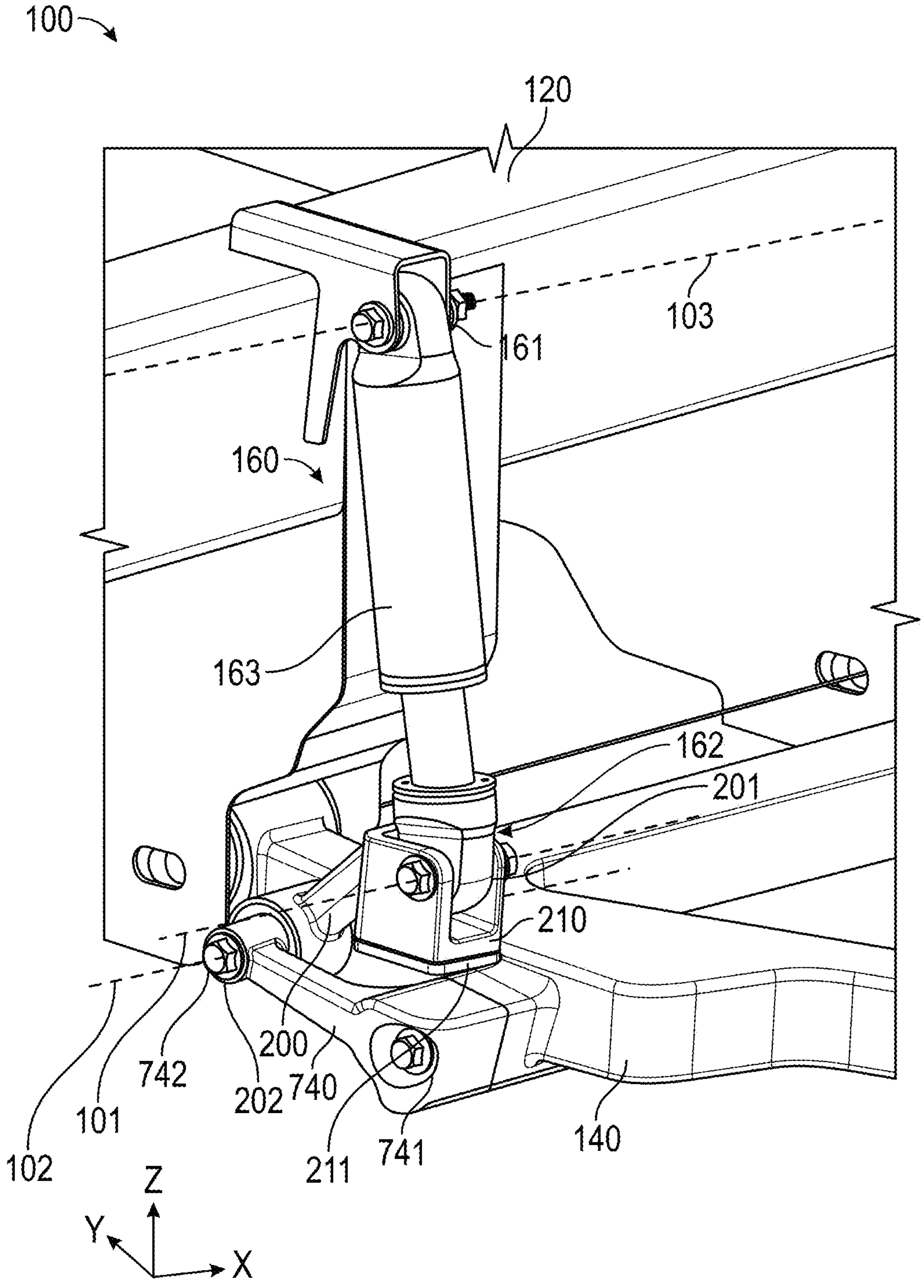
FIG. 6 illustrates a perspective view of a suspension assembly for a vehicle in accordance with an example embodiment.
Figure 7:
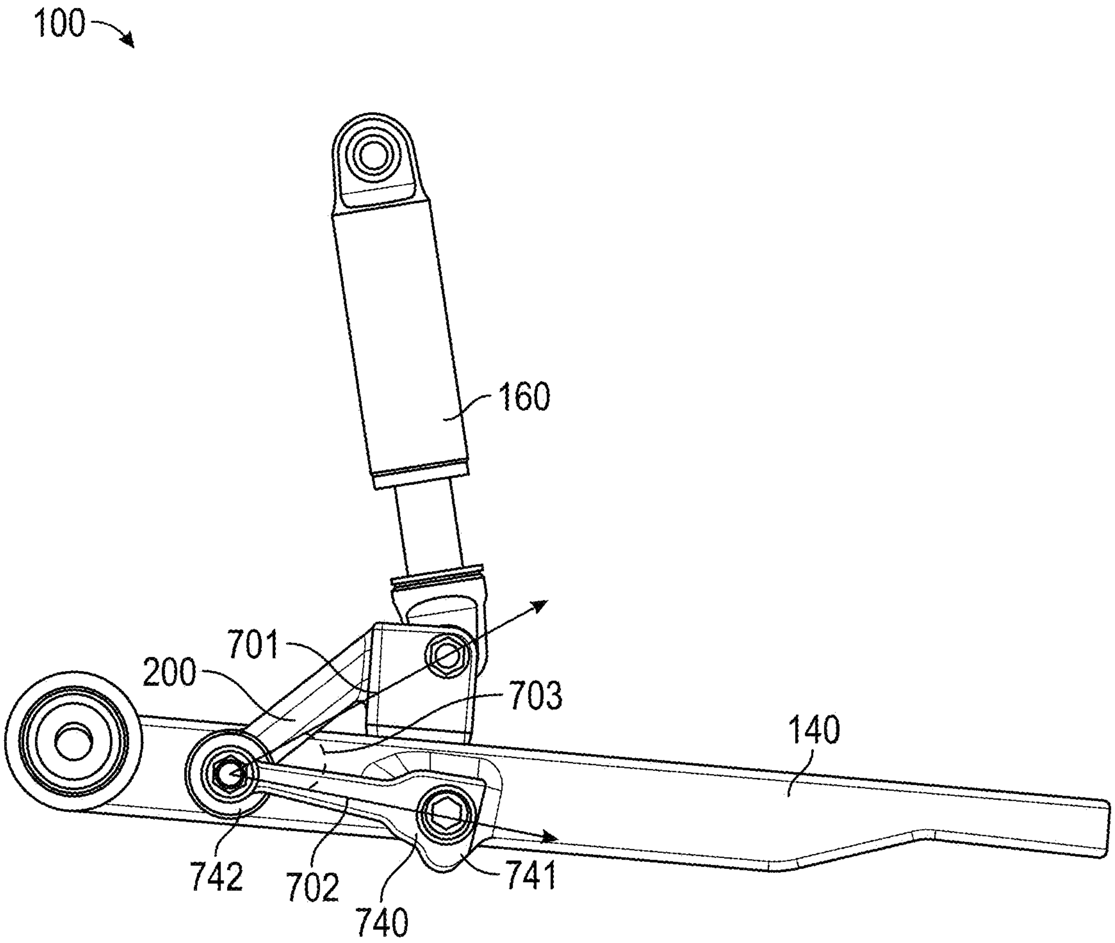
FIG. 7 illustrates a side view of a suspension assembly for a vehicle in a resting position in accordance with an example embodiment.
Figure 8:
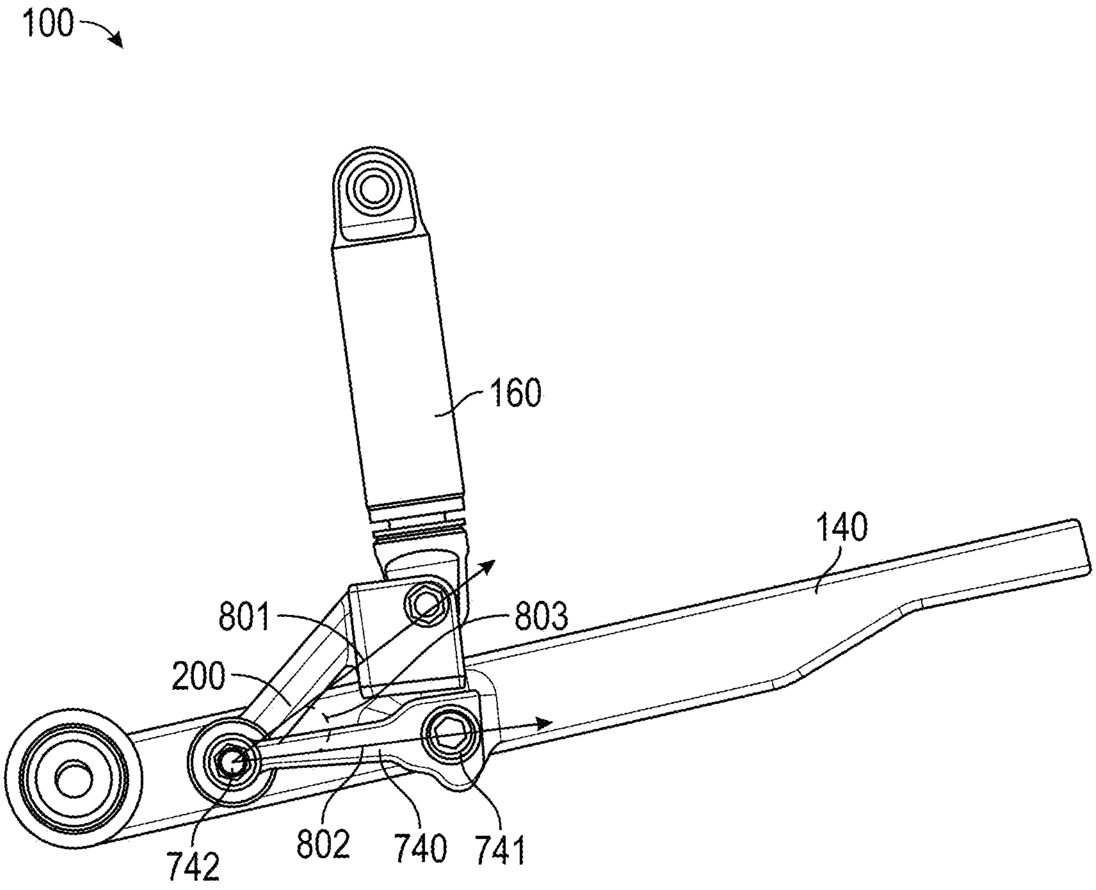
FIG. 8 depicts a side view of a suspension assembly for a vehicle in a jounce position in accordance with an example embodiment.
Figure 9:
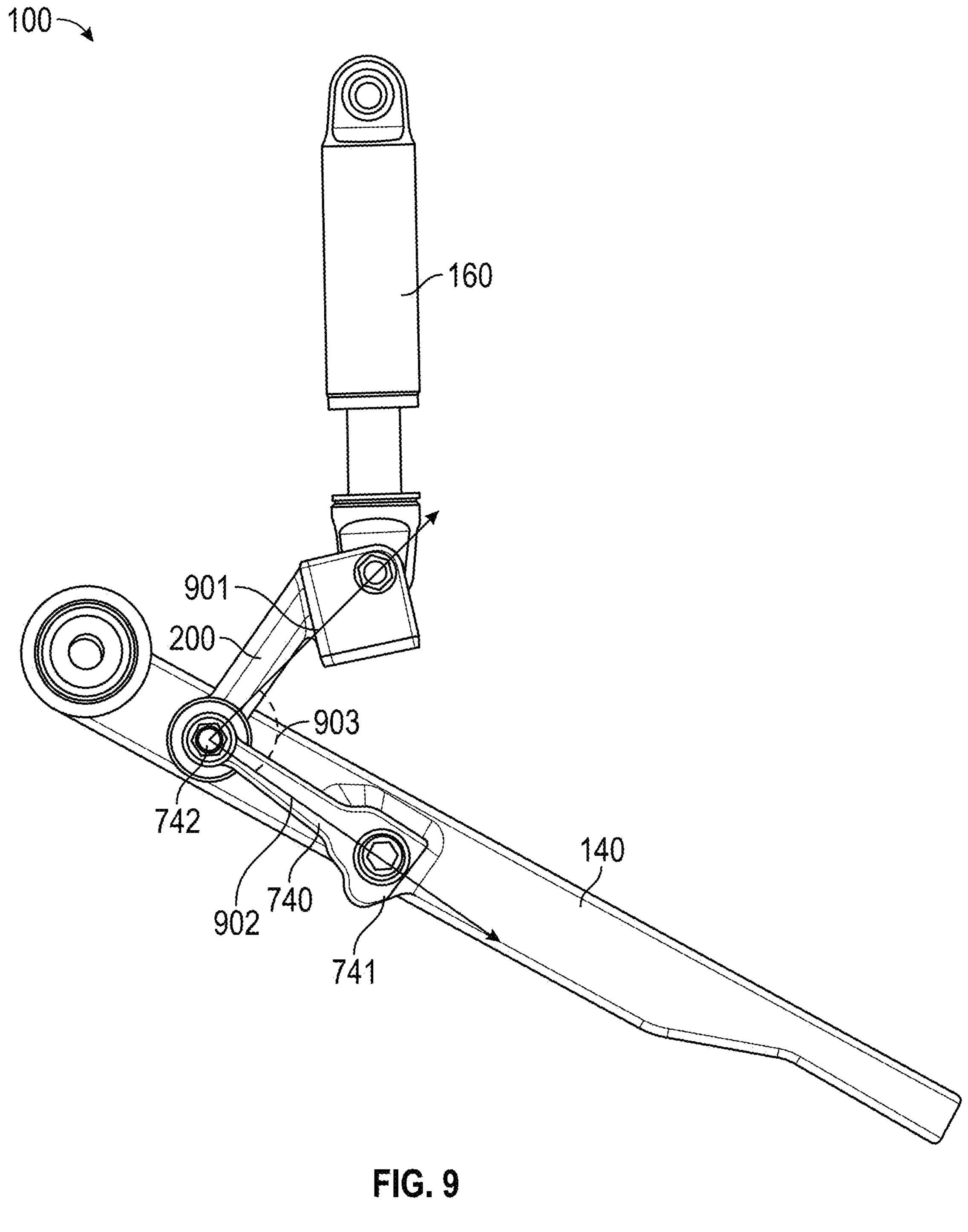
FIG. 9 illustrates a side view of a suspension assembly for a vehicle in a rebound position in accordance with an example embodiment.

FIG. 6 illustrates a suspension assembly in accordance with an example embodiment. FIGS. 7-9 depict the jounce bumper, the control arm, and crank arm during a resting position, a jounce position, and a rebound position, respectively, in accordance with an example embodiment. In some cases, responsive the vehicle 110 being stationary or the vehicle 110 traversing a flat driving surface, the suspension assembly 100 may be in a resting position as seen in FIG. 7. In this regard, the jounce bumper 160 and the control arm 140 may not be engaged, nor the crank arm 200 in an extended position.

In an example embodiment, as seen in FIG. 6-9, the integrated contact pad 240 may be replaced with a contact pad attachment 740 operably coupled to the control arm 140. The contact pad attachment 740 and the integrated contact pad 240 may share the same function, and the contact pad attachment 740 may be operably coupled to the control arm via a variety of fasteners. In some cases, a contact pad attachment 740 may engage with the hammer portion 210 of the crank arm at a first contact pad attachment end 741 and may operably couple with the second crank arm end 202 at a second contact pad attachment end 742. In this regard, the second crank arm end 202 may pivot about the second reference line at the second contact pad attachment end 742.

In an example embodiment, responsive to the suspension assembly 100 being in the resting position, a resting position crank arm reference line 701 may extend substantially parallel to the points of operably coupling of the crank arm 200 with the jounce bumper 160 and the control arm 140, and a resting position control arm reference line 702 may extend substantially parallel to the contact pad attachment 740. The resting position crank arm reference line 701 and the resting position control arm reference line 702 may form a first angle 703.

In some cases, responsive to the vehicle 110 experiencing jounce (e.g. compression of the suspension assembly 100 responsive a bump, landing, etc.), the suspension assembly 100 may be in a jounce position as seen in FIG. 8. The jounce position seen in FIG. 8 may be responsive to max compression of the suspension damper 130, as the (hydraulic) jounce bumper 160 is fully compressed. In the jounce position, the hammer portion 210 (and thus contact surface 211) may be engaged with the control arm (e.g. contact pad attachment 740). In an example embodiment, responsive to the suspension assembly 100 being in the jounce position, a jounce position crank arm reference line 801 may extend substantially parallel to the points of operably coupling of the crank arm 200 with the jounce bumper 160 and the control arm 140, and a jounce position control arm reference line 802 may extend substantially parallel to the contact pad attachment 740. The jounce position crank arm reference line 801 and the jounce position control arm reference line 802 may form a second angle 803.

In some cases, after the vehicle 110 experiences jounce, the suspension assembly 100 may rebound and may be in a rebound position as seen in FIG. 9. The rebound position may be the position of the suspension assembly 100 prior to the return of the suspension assembly 100 to the resting position after jounce. In some cases, the rebound position may be a position extended past the resting position (e.g. as seen in FIG. 9) before returning the resting position. In an example embodiment, responsive to the suspension assembly 100 being in the rebound position, a rebound position crank arm reference line 901 may extend substantially parallel to the points of operably coupling of the crank arm 200 with the jounce bumper 160 and the control arm 140, and a rebound position control arm reference line 902 may extend substantially parallel to the contact pad attachment 740. The rebound position crank arm reference line 901 and the rebound position control arm reference line 902 may form a third angle 903.

The first angle 703 (resting position) may be an angle between the second angle 803 (jounce position) and the third angle 903 (rebound position). The first angle 703, the second angle 803, and third angle 903 may all vary in degree depending on the compression event experienced by the vehicle 110 and the suspension assembly 100. For example, the second angle 803 and the third angle 903 may have an inverse relationship. In this regard, the smaller the second angle 803 may be, the larger the third angle 903 may be as jounce and rebound are directly tied to one another (the larger the compression (or jounce), the larger the rebound).

Figure 10B:
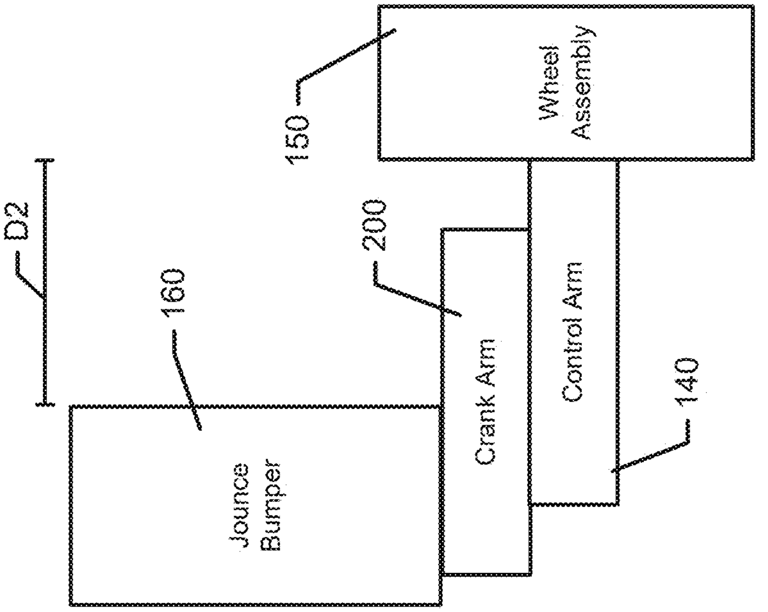
FIG. 10B illustrates a block diagram of a suspension assembly for a vehicle in a jounce position in accordance with an example embodiment.
Figure 10A:
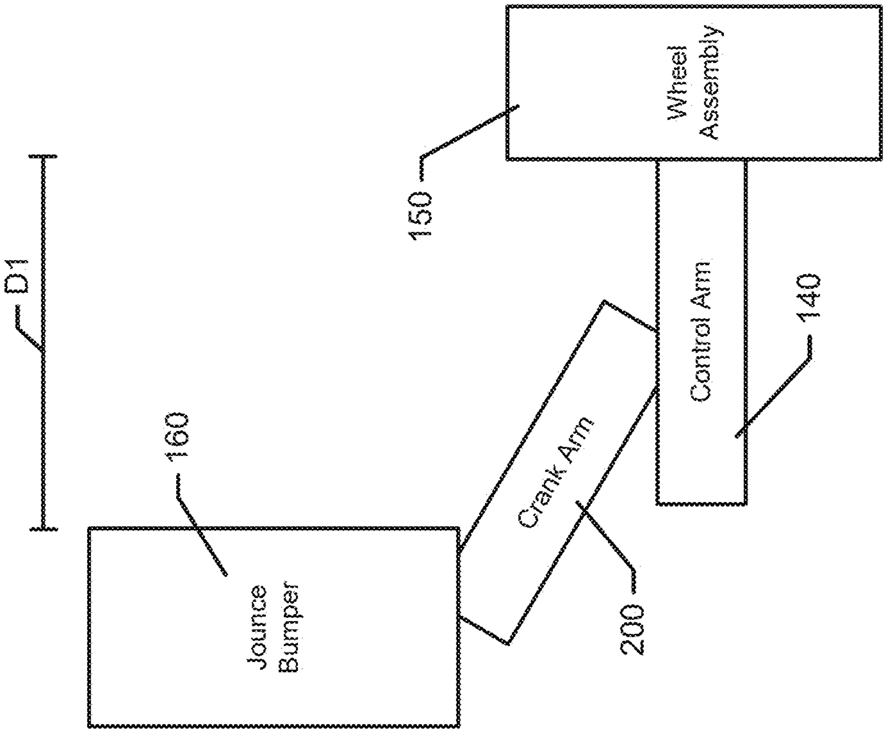
FIG. 10A depicts a block diagram of a suspension assembly for a vehicle in a rebound position in accordance with an example embodiment.

FIGS. 10A and 10B depict a block diagram of the suspension assembly in a rebound positon and a jounce position, respectively, in accordance with an example embodiment. As seen in FIG. 10A, responsive to the vehicle 110 and the suspension assembly 100 being in the rebound position, the jounce bumper 160 and the wheel assembly 150 may be separated in the X-direction by a first distance D1. As seen in FIG. 10B, responsive to the vehicle 110 and the suspension assembly 100 being in the jounce position, the jounce bumper 160 and the wheel assembly 150 may be separated in the X-direction by a second distance D2. In some cases, the second distance D2 may be smaller than the first distance D1, as responsive to jounce, the pivoting of the crank arm 200 may position the jounce bumper 160 closer to the wheel assembly 150. In this regard, the side loads experienced by the suspension assembly 100 and the vehicle 110 may be decreased compared to a lack of change in the first distance D1 and the second distance D2 in standard suspension assemblies.

In some cases, the controller 180 may utilize sensor data from the sensor suite 170 disposed within or proximate to the suspension assembly 100 to send indications to an operator of the vehicle 110 that the jounce bumper 160 may engage with the control arm 140. For example, the sensor suite 170 may include a frame height sensor. The frame height sensor may collect frame high data determined via monitoring the height of the frame 120 relative the suspension assembly 100 and/or the wheel assembly 150. The controller 180 may use the frame height data to determine if a max compression event may occur (e.g. will the jounce bumper 160 engage with the control arm 140, will the suspension damper 130 fully compress, etc.). Responsive to determining the max compression event will occur, the controller 180 may further determine a time until the occurrence of the max compression event (e.g. preemptively determine max compression).

Utilizing the time until the occurrence of the max compression event, the controller 180 is configured to transmit an indication to the operator or trigger an additional system of the vehicle 110 at an exact time of the max compression event. In some cases, the indication may be an auditory indication utilizing at least one of the speakers 112 of the vehicle 110. The auditory indication may include but is not limited to a tone, chime, ring, music, or jingle to indicate the jounce bumper 160 engaged with the control arm 140. In some cases, the indication may be visual indication utilizing at least one of the displays 111 of the vehicle 110. The visual indication may include but is not limited to an animation or message on a heads-up display.

In an example embodiment, the additional systems of the vehicle 110 may be a camera system or capture system. The camera system or capture system may use various internal and external cameras (e.g. dash camera, reverse camera, side cameras, rearview cameras, cabin cameras, etc.) of the vehicle 110 to capture events of the vehicle 110. In some cases, the cameras may be included in the sensor suite 170. At the time of the max compression event, the controller 180 may be configured to trigger the camera system or the capture system to collect videos or pictures of the environment or cabin at the exact time of max compression. For example, the camera system or capture system may record another vehicle traversing an off-road path immediately behind the vehicle 110 utilizing the reverse camera. In some cases, the controller 210 may be configured to start the camera system or capture system for a time period before and after the max compression event to record the full reaction to the vehicle event that caused the max compression event.

A suspension assembly of a vehicle may be therefore provided. The suspension assembly may include a jounce bumper operably coupled to a frame of the vehicle to provide additional damping responsive to max compression of a suspension damper during a compression event, a control arm operably coupled to the frame and a wheel assembly of the vehicle, and a crank arm operably coupled between the jounce bumper and the control arm. The first end of the crank arm may be operably coupled to the jounce bumper, and a second end of the crank arm may be operably coupled to the control arm. The jounce bumper may be pivotable about a first reference line extending in an X-direction of the vehicle at the first end of the crank arm, and the second end of the crank arm may be pivotable about a second reference line extending in the X-direction at the control arm.

The suspension assembly of a vehicle of some embodiments may include additional features, modifications, augmentations and/or the like to achieve further objectives or enhance performance of the suspension assembly. The additional features, modifications, augmentations and/or the like may be added in any combination with each other. Below is a list of various additional features, modifications, and augmentations that can each be added individually or in any combination with each other. For example, the jounce bumper and the wheel assembly may be separated at a first distance in the X-direction during jounce of the suspension assembly, the jounce bumper and the wheel assembly may be separated at a second distance in an X-direction during rebound of the suspension assembly, and the first distance may be smaller than the second distance. In some cases, the crank arm may be curved to increase a movement range of the crank arm. In an example embodiment, the crank arm may include a hammer portion disposed at the first end of the crank arm, and the crank arm may engage a contact pad responsive to jounce. In some cases, the contact pad may be integrated in or operably coupled to the control arm. In an example embodiment, the second end of the crank arm and the contact pad may be disposed at different positions of the control arm. In some cases, one of the contact pad or the hammer portion may include an elastomeric material. In an example embodiment, the hammer portion and the crank arm may only engage during jounce. In some cases, the hammer portion may be rounded to limit contact between the control arm and the jounce bumper. In an example embodiment, suspension assembly may further include a sensor suite and a controller. The sensor suite may include a frame height sensor, and the controller may be configured to preemptively determine the max compression of the suspension damper based on frame height data determined by the frame height sensor. In some cases, responsive to the controller preemptively determining the max compression of the suspension damper, an indication may be transmitted to the operator of the vehicle at max compression of the suspension damper. In an example embodiment, the indication may be an auditory indication via speakers of the vehicle or a visual indication via a display of the vehicle. In some cases, the sensor suite may include a camera, and responsive to the controller preemptively determining the max compression of the suspension damper, the controller may be configured to capture a video using the camera at max compression of the suspension damper.

A jounce bumper for a suspension assembly of a vehicle of an example embodiment may be provided. The jounce bumper may include a first end operably coupled to a frame of the vehicle, a body portion to provide additional damping responsive to max compression of a suspension damper during a compression event, and a second end operably coupled to a crank arm. The crank arm may operably couple the second end to a control arm, a first crank arm end of the crank arm may operably couple to the second end, and a second crank arm end of the crank arm may operably couple to the control arm. The jounce bumper may be pivotable about a first reference line extending in an X-direction of the vehicle at the first crank arm end, and the second crank arm end may be pivotable about a second reference line extending in the X-direction at the control arm.

M any modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to difficulties are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

Such operations described herein should always be implemented and/or performed in accordance with the owner's manual and safety guidelines.

What is claimed:

1. A suspension assembly of a vehicle, the suspension assembly comprising:

a jounce bumper operably coupled to a frame of the vehicle to provide additional damping responsive to max compression of a suspension damper during a compression event;

a control arm operably coupled to the frame and a wheel assembly of the vehicle; and a crank arm operably coupled between the jounce bumper and the control arm, wherein a first end of the crank arm is operably coupled to the jounce bumper and a second end of the crank arm is operably coupled to the control arm, wherein the jounce bumper is pivotable about a first reference line extending in an X-direction of the vehicle at the first end of the crank arm, wherein the second end of the crank arm is pivotable about a second reference line extending in the X-direction at the control arm, wherein the suspension assembly further comprises a sensor suite and a controller, wherein the sensor suite includes a frame height sensor, and wherein the controller is configured to preemptively determine the max compression of the suspension damper based on frame height data determined by the frame height sensor.

2. The suspension assembly of claim 1, wherein the jounce bumper and the wheel assembly are separated at a first distance in a Y-direction during jounce of the suspension assembly, wherein the jounce bumper and the wheel assembly are separated at a second distance in the Y-direction during rebound of the suspension assembly, and wherein the first distance is smaller than the second distance.

3. The suspension assembly of claim 1, wherein the crank arm is curved to increase a movement range of the crank arm.

4. The suspension assembly of claim 1, wherein the crank arm includes a hammer portion disposed at the first end of the crank arm, and wherein the crank arm engages a contact pad responsive to jounce.

5. The suspension assembly of claim 4, wherein the contact pad is integrated in or operably coupled to the control arm.

6. The suspension assembly of claim 5, wherein the second end of the crank arm and the contact pad are disposed at different positions of the control arm.

7. The suspension assembly of claim 4, wherein one of the contact pad or the hammer portion includes an elastomeric material.

8. The suspension assembly of claim 4, wherein the hammer portion and the crank arm only engage during jounce.

9. The suspension assembly of claim 4, wherein the hammer portion is rounded to limit contact between the control arm and the jounce bumper.

10. The suspension assembly of claim 1, wherein responsive to the controller preemptively determining the max compression of the suspension damper, an indication is transmitted to an operator of the vehicle at max compression of the suspension damper.

11. The suspension assembly of claim 10, wherein the indication is an auditory indication via speakers of the vehicle or a visual indication via a display of the vehicle.

12. The suspension assembly of claim 1, wherein the sensor suite includes a camera, and wherein responsive to the controller preemptively determining the max compression of the suspension damper, the controller is configured to capture a video using the camera at max compression of the suspension damper.

13. A jounce bumper for a suspension assembly of a vehicle, the jounce bumper comprising:

a first end operably coupled to a frame of the vehicle;

a body portion to provide additional damping responsive to max compression of a suspension damper during a compression event; and a second end operably coupled to a crank arm, wherein the crank arm operably couples the second end to a control arm, wherein a first crank arm end of the crank arm is operably coupled to the second end and a second crank arm end of the crank arm is operably coupled to the control arm, wherein the jounce bumper is pivotable about a first reference line extending in an X-direction of the vehicle at the first crank arm end, wherein the second crank arm end is pivotable about a second reference line extending in the X-direction at the control arm, wherein the crank arm engages a contact pad responsive to jounce, wherein the contact pad is externally operably coupled to the control arm, and wherein the second crank arm end pivots in-plane with an extension plane of the control arm.

14. The jounce bumper of claim 13, wherein the crank arm is curved to increase a movement range of the crank arm.

15. The jounce bumper of claim 13, wherein the crank arm includes a hammer portion disposed at the first crank arm end.

16. The jounce bumper of claim 13, wherein the second crank arm end and the contact pad are disposed at different positions of the control arm.

17. The jounce bumper of claim 15, wherein one of the contact pad or the hammer portion includes an elastomeric material.

18. The jounce bumper of claim 15, wherein the hammer portion and the crank arm only engage during jounce.

19. A suspension assembly of a vehicle, the suspension assembly comprising:

a jounce bumper operably coupled to a frame of the vehicle to provide additional damping responsive to max compression of a suspension damper during a compression event;

a control arm operably coupled to the frame and a wheel assembly of the vehicle; and a crank arm operably coupled between the jounce bumper and the control arm, wherein a first end of the crank arm is operably coupled to the jounce bumper and a second end of the crank arm is operably coupled to the control arm, wherein the jounce bumper is pivotable about a first reference line extending in an X-direction of the vehicle at the first end of the crank arm, wherein the second end of the crank arm is pivotable about a second reference line extending in the X-direction at the control arm, wherein the crank arm engages a contact pad responsive to jounce, wherein the contact pad is integrated and in-plane with an extension plane of the control arm, and wherein the second crank arm end pivots in-plane with the extension plane of the control arm.

* * * * *